(12) United States Patent
Kowalchuk (10) Patent No.: US 11,197,407 B2
(45) Date of Patent: Dec. 14, 2021

(54) IMPLEMENT MOUNTED SENSORS TO INCREASE SEEDING PRODUCTIVITY

(71) Applicant: CNH Industrial Canada, Ltd., Saskatoon (CA)

(72) Inventor: Trevor Lawrence Kowalchuk, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 273 days.

(21) Appl. No.: 16/397,785

(22) Filed: Apr. 29, 2019

(65) Prior Publication Data
US 2020/0337209 A1    Oct. 29, 2020

(51) Int. Cl.
*A01B 76/00* (2006.01)
*A01C 7/10* (2006.01)
*A01B 79/00* (2006.01)
*A01C 5/06* (2006.01)

(52) U.S. Cl.
CPC .......... *A01B 76/00* (2013.01); *A01B 79/005* (2013.01); *A01C 7/105* (2013.01); *A01C 5/06* (2013.01)

(58) Field of Classification Search
CPC ....... A01B 79/005; A01B 79/00; A01B 76/00; A01C 5/06; A01C 7/105; A01C 5/00; A01C 7/102; A01C 7/10; A01C 7/08; A01C 7/00
See application file for complete search history.

(56) References Cited

U.S. PATENT DOCUMENTS

| | | | |
|---|---|---|---|
| 4,288,814 A | 9/1981 | Talley et al. | |
| 5,621,666 A * | 4/1997 | O'Neall | A01C 7/102 |
| | | | 700/283 |
| 5,685,245 A * | 11/1997 | Bassett | A01B 79/005 |
| | | | 111/62 |
| 8,078,367 B2 | 12/2011 | Sauder et al. | |
| 9,282,688 B2 | 3/2016 | Casper et al. | |
| 9,288,938 B2 | 3/2016 | Cavender-Bares et al. | |
| 9,332,689 B2 | 5/2016 | Baurer et al. | |
| 9,555,803 B2 | 1/2017 | Pawlicki et al. | |
| 9,643,605 B2 | 5/2017 | Pawlicki et al. | |
| 2005/0085973 A1 | 4/2005 | Furem et al. | |
| 2013/0116896 A1 | 5/2013 | Blank | |

(Continued)

FOREIGN PATENT DOCUMENTS

WO    2017049186 A1    3/2017

*Primary Examiner* — Christopher J. Novosad
(74) *Attorney, Agent, or Firm* — Rebecca L. Henkel; Rickard K. DeMille (57) ABSTRACT

An agricultural implement having a row unit and a material throw monitoring system. The row unit includes a ground engaging tool configured to engage with a ground at a ground engaging point to form a trench, and a conduit configured to deposit an agricultural product in the trench. The material throw monitoring system includes a sensor and a controller. The sensor is oriented toward the ground engaging point and configured to provide feedback to the controller based at least in part on material displaced by the ground engaging tool. The controller is configured to determine a throw distance of the material relative to the ground engaging tool based on the feedback from the sensor, determine an action to adjust operation of the agricultural implement based on a comparison of the throw distance with a threshold, and communicate the action with a controller coupled to the agricultural implement.

20 Claims, 4 Drawing Sheets

(56) References Cited

U.S. PATENT DOCUMENTS

| | | |
|---|---|---|
| 2014/0215983 A1 | 8/2014 | Pollklas |
| 2015/0296701 A1 | 10/2015 | Anderson |
| 2015/0379785 A1 | 12/2015 | Brown, Jr. et al. |
| 2016/0223511 A1 | 8/2016 | Koshnick et al. |
| 2017/0094894 A1 | 4/2017 | Heim et al. |
| 2017/0112043 A1 | 4/2017 | Nair et al. |
| 2017/0142900 A1 | 5/2017 | Mahieu et al. |
| 2019/0195788 A1* | 6/2019 | Liu ................. G01N 21/33 |
| 2019/0254223 A1* | 8/2019 | Eichhorn ........... A01C 7/203 |

* cited by examiner

IMPLEMENT MOUNTED SENSORS TO INCREASE SEEDING PRODUCTIVITY

BACKGROUND

The present disclosure relates to agricultural equipment, and more particularly to agricultural planting or seeding implements.

Seeding implements are typically towed behind a tractor or other work vehicle across a field. For example, a tongue of the seeding implement may be connected to a drawbar of the tractor, or a mast of the seeding implement may be connected to a hitch of the tractor. In order to plant the seeds, the seeding implements typically include a ground engaging tool or opener that forms a trench in the soil for seed deposition into the soil of the field. Soil may be reformed over the deposited seed as part of a row in the field. The ground engaging tool or opener may also displace field residue away from the row. The displaced soil and field residue are thrown aside from the trench. Soil and field residue thrown on a nearby row may delay or even prevent the emergence of seeds from the row. Soil and field residue thrown on a nearby row yet to be planted may also increase the force used by the ground engaging tool or opener to form the trench for future rows.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

A first embodiment describes an agricultural planting or seeding implement having at least one row unit and a material throw monitoring system. The at least one row unit includes a ground engaging tool configured to engage with a ground surface at a ground engaging point to form a trench, and a conduit configured to deposit one or more agricultural products in the trench. The material throw monitoring system includes a sensor and a controller. The sensor is oriented toward the ground engaging point and configured to provide feedback to a controller based at least in part on material displaced by the ground engaging tool in an area around the ground engaging tool. The controller is configured to determine a throw distance of the material relative to the ground engaging tool based on the feedback from the sensor, determine an action to adjust operation of the agricultural planting or seeding implement based on a comparison of the throw distance with a threshold, and communicate the action with a vehicle controller of a vehicle coupled to the agricultural planting or seeding implement.

A second embodiment describes a method of operating an agricultural implement. The method includes engaging a ground engaging tool of a row unit of an agricultural planting or seeding implement with a ground surface at a ground engaging point to form a trench, depositing one or more agricultural products from the agricultural planting or seeding implement into the trench, and monitoring an area around the ground engaging point with a sensor oriented toward the ground engaging point. The method may include providing feedback from the sensor to a controller based at least in part on material displaced by the ground engaging tool in the area, determining a throw distance of the material based on the feedback, comparing the throw distance to one or more thresholds, and determining an action to adjust the throw distance of the material based on comparing the throw distance to the one or more thresholds.

A third embodiment describes an agricultural planting or seeding system having a plurality of row units and a material throw monitoring system. Each row unit includes a respective ground engaging tool configured to engage with a ground surface at a respective ground engaging point to form a respective trench. The plurality of row units is configured to form a plurality of trenches with a row spacing between the respective trenches of the plurality of trenches. The material throw monitoring system includes a plurality of sensors and a controller. Each sensor is associated with a row unit of the plurality of row units, and each sensor is configured to provide a feedback based at least in part on material displaced in a respective area by the respective ground engaging tool in the respective area. The controller is configured to determine a plurality of throw distances of the material relative to the respective trenches formed by the plurality of row units based on the feedback from the plurality of sensors, and to automatically implement an action configured to reduce a throw distance of the plurality of throw distances in response to determining that the throw distance is within a minimum distance of the row spacing.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Modern farming uses a variety of agricultural implements to harvest crops, prepare the soil for planting, and for planting. These agricultural implements are commonly referred to as harvesters, tillers, seeders, and planters. Planters enable seed planting by first opening a trench in the soil with an opening system. The planter then deposits seeds into the trench, after which the trench is covered with soil by a closing system. In order to optimize yields of some crops, there may be an optimal depth below the surface for seed deposition and/or fertilizer deposition. This distance may ensure that the plants in each row are close enough to the surface to grow, have sufficient contact with soil to receive nutrients, and sufficient atmospheric warmth to grow. In the case of fertilizer placement, deposition of fertilizer at an optimal depth may facilitate desired timing and quantity of nourishment for the growing plant. To improve control the depth at which the trench is formed, the agricultural implement may include a material throw monitoring system that monitors the thrown material (e.g., soil, field residue) from the ground engaging tools. Feedback from the material throw monitoring system may be used to reduce or eliminate material thrown on nearby rows. Additionally, or in the alternative, feedback from the material throw monitoring system may be used to reduce or eliminate material thrown on locations of future rows yet to be planted.

Material thrown outside of a desired threshold may otherwise affect the depth of planted seeds in nearby rows. Material thrown outside of the desired threshold may also affect the load on the ground engaging tools forming the trench for the nearby rows. In some embodiments, feedback from the material throw monitoring system may be used to adjust operation of the agricultural planting or seeding implement. For example, feedback from the material throw monitoring system may be used directly or indirectly to increase the speed of the agricultural implement across the field, thereby enabling the agricultural implement to seed or plant more acreage in a given time. The material throw monitoring system may notify an operator that a speed of a tractor pulling the agricultural implement may be increased without negatively affecting the planting depth of the nearby planted rows. In some embodiments, feedback from the material throw monitoring system may be used directly or indirectly to decrease the speed of the agricultural implement across the field to reduce the material displaced on nearby rows, thereby enabling improvement in an emergence rate of the planted seeds.

Figure 1:
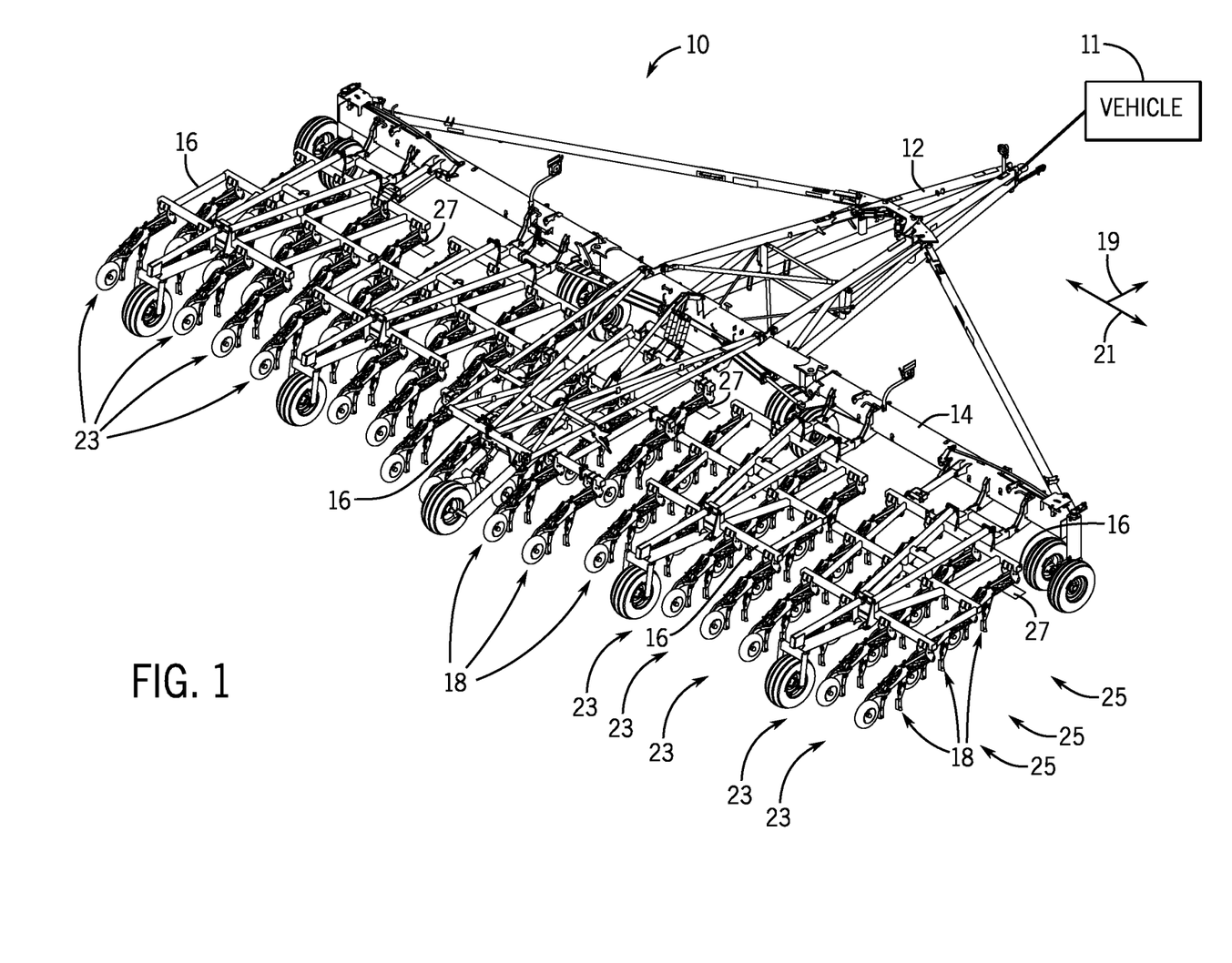
FIG. 1 is a perspective view of an agricultural implement including components of a material throw monitoring system and a plurality of row units.

Turning now to the drawings, FIG. 1 is a perspective view of an agricultural implement 10 (e.g., seeding implement). The implement 10 is designed to be towed behind a work vehicle 11, such as a tractor. The implement 10 includes a tow bar assembly 12 which is shown in the form of an A-frame hitch assembly. The tow bar assembly 12 may include a hitch used to attach to an appropriate tractor hitch via a ball, clevis, or other coupling. The tow bar assembly 12 is coupled to a tool bar 14 which supports multiple tool frames 16. Each tool frame 16 includes multiple seeding implements, such as the illustrated row units 18. Although the row units 18 illustrated in the figures and discussed below are hoe openers, it is appreciated that other ground engaging tools or row units, such as discs, may be utilized with embodiments of the throw monitoring system described herein. In some embodiments, the hoe openers 18 include a depth adjustment assembly configured to facilitate rapid reconfiguration of the hoe opener 18 for varying penetration depths. The work vehicle 11 may pull the seeding implement 10 in a direction of travel 19. Multiple hoe openers 18 of the seeding implement 10 are arranged along an axis 21 that is substantially perpendicular to the direction of travel 19.

Each of these hoe openers 18 may be configured to engage with the field and form a trench such that one or more of agricultural products (e.g., seed, fertilizer, inoculant) may be directed into the trench. In some embodiments, the hoe openers 18 of the seeding implement are arranged in rows 23 across the axis 21, where each row 23 may be generally aligned with the direction of travel 19. Each row 23 of the seeding implement 10 may include one or more ranks 25 of hoe openers 18, where the ranks 25 of hoe openers 18 within a row are offset from each other along the direction of travel 19. For example, the seeding implement 10 shown in FIG. 1 has twenty-two (22) rows 23, and each row has three (3) ranks of hoe openers 18. It is appreciated that embodiments of the seeding implement 10 may have multiple rows 23 of hoe openers 18, such as between 2 to 100 rows, 3 to 75 rows, 4 to 50 rows, or 5 to 25 rows. Moreover, embodiments of the seeding implement 10 may have one or more ranks 25 in each row 23, such as 1, 2, 3, 4, 5, 6, or more ranks 25. In some embodiments, the ranks 25 are configured to form the trench for application of the agricultural product at a desired depth while facilitating flow through of soil and residue through the seeding implement 10. As discussed herein, a material throw monitoring system 27 of the agricultural implement 10 monitors the soil and residue through the agricultural implement 10. Based on feedback from the material throw monitoring system 27, the speed of the vehicle 11 and the implement 10 may be adjusted. For example, the speed of the vehicle 11 and the implement 10 may be decreased based on feedback indicative of soil or residue thrown on or near other rows. The speed of the vehicle 11 and the implement 10 may be increased based on feedback indicative that soil or residue thrown from the hoe openers 18 is within a desired threshold for one or more of the hoe openers 18 monitored by the material throw monitoring system 27.

Figure 2:
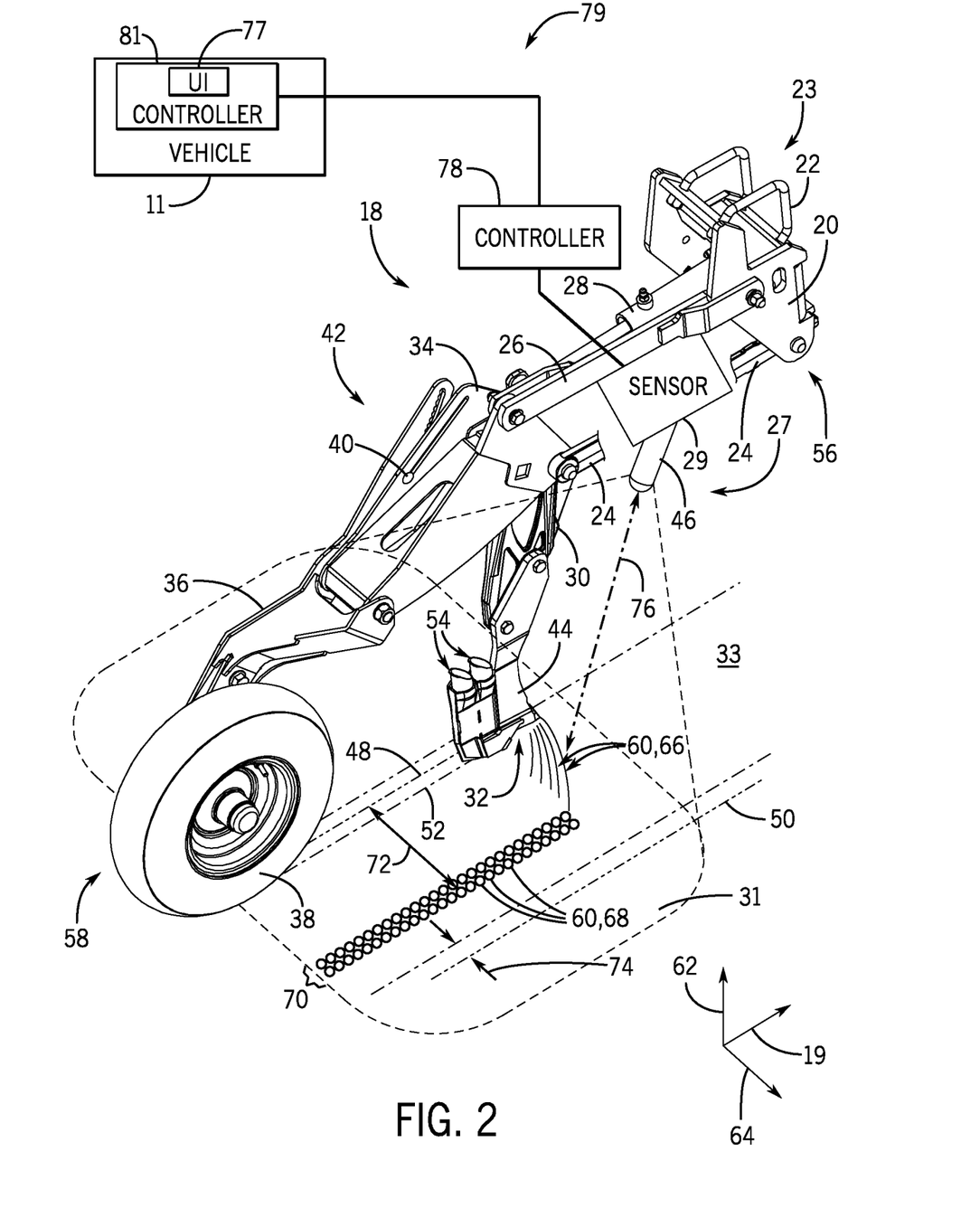
FIG. 2 is a perspective view of an embodiment of a row unit of the agricultural implement in FIG. 1 and the material throw monitoring system.

FIG. 2 is a perspective view of a hoe opener 18 having the material throw monitoring system 27 configured to monitor material (e.g., soil, residue) thrown as the ground engaging tools (e.g., hoe openers 18) engages at a ground engaging point 32 of a surface of the ground 33 in the field. One or more sensors 29 of the material throw monitoring system 27 monitor an area 31 around the ground engaging point 32 of the opener 18. In some embodiments, the hoe opener 18 includes a depth control adjustment assembly 42 with a frame support 20, mounting brackets 22, a first member 24, a second member 26, and a biasing device such as a cylinder 28 (e.g., hydraulic and/or pneumatic piston-cylinder assembly). The cylinder 28 may be hydraulically coupled to a power supply that provides a flow of pressurized hydraulic fluid which displaces a piston rod extending from the cylinder. The frame support 20 and frame bracket 22 are configured to interface with the tool frame 16, thereby securing the hoe opener 18 to the seeding implement 10. For instance, multiple hoe openers 18 may be mounted in parallel along the tool frame 16 to form multiple rows 23 of a seeding unit. In the present configuration, the first member 24, the second member 26, and the frame support 20 form elements of a parallel linkage, also known as a four bar linkage. In some embodiments, the hoe opener 18 may have a trailing arm without the second member 26, such that a member is configured to pivot on the frame support 20 and the cylinder 28 is configured to pivot the hoe opener 18 vertically along an axis 62. As will be appreciated, components of the hoe opener 18, such as the frame support 20, mounting brackets 22, first member 24, and second member 26, may be made of any suitable material, such as steel.

The cylinder 28 is attached to a shank 30 via a pin at the end of the piston rod. A ground engaging tool, such as an illustrated blade 44, is also coupled to the shank 30 and configured to engage the soil at the ground engaging point 32. Contact force between the blade 44 and the soil establishes a moment about a shank pivot joint. This moment is resisted by force applied to the shank 30 by the cylinder 28. Furthermore, the linkage is configured to facilitate vertical movement of the implement 10, while maintaining the blade 44 at a desired penetration depth within the soil. As illustrated, the linkage is coupled to a packer support structure, such as the illustrated packer support plate 34.

A packer arm 36, including a packer wheel 38, is pivotally coupled to the packer support structure 34. The packer wheel 38 rotates along the soil surface to both pack the soil on top of deposited seeds and limit the penetration depth of the blade 44. As illustrated, a pin 40 disposed through openings within the packer arm 36 and the packer support structure 34 enables rotation of the packer arm 36 with respect to the packer support structure 34. However, in a working mode, rotation of the packer arm 36 relative to the packer support structure 34 is blocked by a depth adjustment assembly 42. As discussed in detail below, the depth adjustment assembly 42 includes a fastener disposed within a slot in the packer support structure 34 and a corresponding slot in the packer arm 36. While in a locked position, the fastener blocks rotation of the packer arm 36 with respect to the packer support structure 34. Conversely, while in an unlocked position, the fastener may be translated within the respective slots to adjust the rotation of the packer arm 36 about the pin 40. Such an adjustment varies the vertical position of the blade 44 relative to the packer wheel 38, thereby altering the penetration depth of the blade 44. Once a desired penetration depth has been established, the fastener may be locked into position, thereby limiting rotation of the packer arm 36 and enabling the hoe opener 18 to enter the working mode. In some embodiments, the depth adjustment assembly 42 utilizes a cam that may be controlled to adjust the depth along the vertical axis 62. As previously discussed, the packer wheel 38 rotates across a surface of the soil to limit the penetration depth of the blade 44. The packer wheel 38 may at least partially close a trench over the one or more agricultural products disposed in the trench by the hoe opener 18. Consequently, the difference in vertical position between the packer wheel 38 and the blade 44 defines the penetration depth of the blade 44 within the soil at the ground engaging point 32. Because the fastener 40 remains disposed within the slots during the adjustment process, the penetration depth of the blade 44 may be varied more rapidly than configurations that require removal of the fastener to reposition the packer arm.

The sensor 29 of the material throw monitoring system 27 is configured to monitor the area 31 around the ground engaging point 32 where the blade 44 interfaces with the soil. The sensor 29 may include, but is not limited to an imaging device such as a camera, an infrared camera, a multispectral camera, a camera with depth sensor, a LIDAR sensor, or an ultrasonic sensor, or any combination thereof. In some embodiments, the sensor 29 is an optical camera (e.g., RGB camera) with a lens 46 oriented toward the area 31. The sensor 29 of the material throw monitoring system may be disposed ahead of the ground engaging point 32 relative to the direction of travel 19, and oriented rearward toward the ground engaging point 32 or toward a rear end 58 of the agricultural implement 10. This rearward orientation of the sensor 29 away from the direction of travel 19 may reduce interaction or exposure of the sensor 29 with soil, dust, residue, or debris while the agricultural implement 10 traverses a field. In some embodiments, the sensor 29 may be disposed at or near a front end 56 of the agricultural implement 10, such as on or ahead of a first rank 25 of the agricultural implement 10 relative to the direction of travel 19. The sensor 29 may monitor at least a portion of a volume above the area 31, such as a volume portion that includes the trajectories of most material displaced by the blade 44.

As discussed herein, the sensor 29 monitors the area 31 around the blade 44 that engages with the soil at the ground engaging point 32 to form a current row 48 in the ground 33. The blade 44 forms a trench 52 behind the ground engaging point 32 when the blade 44 is pulled through the soil in the direction of travel 19. The opener 18 may deposit one or more agricultural products (e.g., seed, fertilizer, inoculant) into the trench 52 through conduits 54 behind the blade 44 and ahead of the packer wheel 38. The area 31 monitored by the sensor 29 may also include one or more nearby rows 50. While the nearby row 50 is illustrated in FIG. 2 as adjacent to the current row 48, some nearby rows 50 within the area 31 may not be directly adjacent to the current row 48. Moreover, the nearby rows 50 may include rows that received one or more agricultural products from a prior pass of the agricultural implement 10 across the field, rows that will receive one or more agricultural products from the agricultural implement 10 in the same pass as the current row 48, and rows that will receive one or more agricultural products from the agricultural implement 10 in a future pass across the field.

FIG. 2 illustrates material 60 (e.g., soil, residue, debris) displaced or thrown away from the blade 44 as the blade 44 forms the trench 52 for the current row 48. The material 60 may be displaced in an upward direction along the vertical axis 62 away from the ground 33 and in a radial direction 64 from the blade 44 toward nearby rows 50 on one or both sides of the blade 44. As discussed herein, the reference number 66 references airborne material or upwardly thrown material 60 displaced by the blade 44, and the reference number 68 references settled material 60 on the ground 33. The material 60 may be displaced from the blade 44 to form one or more ridges 70 aside from the blade 44. In some embodiments, the material 60 displaced from the blade 44 is distributed such that the ridges 70 are formed a throw distance 72 from the current row 48, which is formed behind the blade 44. In some embodiments, the material throw monitoring system 27 may detect and monitor the ridges 70 of the settled material 68 and determine the throw distance 72. The throw distance 72 may be a determined at a center of the ridges, an outer edge of the ridge 70 in the radial direction 64 relative to the blade 44, or another distance from the blade 44 to a portion of the ridge 70. Additionally, or in the alternative, the material throw monitoring system 27 may detect and monitor the thrown material 66 and determine the throw distance 72. As discussed herein the material throw monitoring system 27 is configured to monitor the area 31 to reduce or eliminate the occurrences of the material 60 displaced onto nearby rows 50 or displaced to be within a minimum distance 74 of nearby rows 50.

Factors that may affect the throw distance 72 from the blade 44 of the current row 48 include the depth of the trench 52, the type of the ground engaging tool (e.g., blade 44, disc), the shape of the ground engaging tool, the moisture content of the soil, the composition of the soil, the density or compactness of the soil, the load on the ground engaging tool, and the speed of the ground engaging tool through the soil, among others. For example, a deeper trench 52 may increase the volume of material 60 displaced by the blade 44, and a shallower trench 52 may increase the throw distance 72 of the material 60 thrown by the blade 44. Blade-type ground engaging tools may displace more material 60 and/or throw the material 60 a greater throw distance 72 than disc-type ground engaging tools. Additionally, drier soil may have a greater throw distance 72 than damp soil. Also, a sandy composition soil may have a greater throw distance 72 than a silty-clay composition soil. Higher loads on the ground engaging tool may increase the throw distance 72 of the material.

Furthermore, higher speeds of the ground engaging tool through the soil may relate to greater throw distances 72 of the material 60 than lower speeds of the ground engaging tool. For example, increasing the speed of the vehicle 11 and the implement 10 across the field may increase the throw distance 72 from the ground engaging tools (e.g., blades 44) of the implement 10. Decreasing the speed of the vehicle 11 and the implement 10 across the field may decrease the throw distance 72 from the ground engaging tools (e.g., blades 44) of the implement 10. In some embodiments, the material throw monitoring system 27 suggests to the operator of the vehicle 11 and the implement an action related to the speed of the vehicle 11 to adjust the throw distance 72 from one or more hoe openers 18 of the implement 10. In some embodiments, the material throw monitoring system 27 controls the speed of the vehicle 11 to adjust the throw distance 72 from the one or more hoe openers 18 of the implement 10. For example, the material throw monitoring system 27 may reduce the speed of the vehicle to reduce the throw distance 72 in response to the determination that material 60 is displaced onto nearby rows 50 or displaced to be within a minimum distance 74 of nearby rows 50. In some embodiments, the minimum distance 74 may be defined by an operator, and may be 6, 5, 4, 3, 2, or 1 inch or less.

The sensor 29 may provide feedback from the monitored area 31 to a controller 78 of the material throw monitoring system 27. In some embodiments, the controller 78 is configured to use feedback from the sensor 29 to determine a measured distance 76 from the sensor 29 to the thrown material 66 and/or to the settled material 68. For example, feedback from a LIDAR sensor, an ultrasonic sensor, or a camera with depth sensor may be used to determine the throw distance 72 based on the measured distance 76 and a known arrangement of the sensor 29 relative to the ground engaging point 32 or location of the hoe opener 18. The feedback from the sensor 29 may be used to determine multiple distances 76 between the sensor 29 and monitored objects within the area 31. For example, the controller 78 may use depth of field feedback from the sensor 29 to determine the measured distance 76 to one or more ridges 70 of the material 60 displaced from the trench 52 for the current row, to determine characteristics (e.g., width, height) of the one or more ridges 70, to determine a height in the 62 upward direction of thrown material 66, to determine the measured distance 76 to one of the nearby rows 50, or any combination thereof. In some embodiments, the controller 78 of the material throw monitoring system 27 receives feedback related to multiple hoe openers 18 of the implement 10 from respective sensors 29. For example, the controller 78 of the material throw monitoring system 27 may receive first feedback related to a first area monitored by a first sensor on a peripheral row unit of the implement 10, and the controller 78 may receive second feedback related to a second area monitored by a second sensor on a central row unit of the implement 10. The controller 78 may determine a peripheral throw distance based on the first feedback from the first sensor, and the controller 78 may determine a central throw distance based on the second feedback from the second sensor. The controller 78 may estimate the throw distance of intermediate row units between sensors of the material throw monitoring system 27 based at least in part on the feedback from multiple sensors distributed across the implement 10.

The controller 78 of the material throw monitoring system 27 may be disposed on the agricultural implement 10 or the vehicle 11. The controller 78 may be communicatively coupled to a controller 81 of the vehicle 11 via a network 79. The network 79 may include a wired connection (e.g., Ethernet, universal serial bus (USB), CANbus, ISObus, other suitable wired connections, or a combination thereof) and/or a wireless connection (e.g., Wi-Fi, Bluetooth, other suitable wireless connections, or a combination thereof) between a user interface 77 of the vehicle 11, the vehicle controller 81, and the controller 78 of the agricultural implement 10. The vehicle controller 81 may be configured to control the speed of the vehicle 11 and the agricultural implement 10, the depth of the hoe openers 18 of the implement 10, among other parameters of an agricultural operation. Further, the network 79 may include one or more connections on different transport protocols. Additionally or alternatively, each hoe opener 18 have a CAN network that enables closed loop control of residue coulters or clearing systems for the hoe opener 18. Through the network 79, the controller 78 may be configured to control parameters (e.g., speed, tool depth) of the vehicle 11 and/or the agricultural implement 10 that may affect the throw distance from the blades 44. The user interface 77 may include a display and/or indicators to communicate information (e.g., notifications, suggestions) to the operator of the vehicle 11. Additionally, the user interface 77 may utilize the display and/or input structures (e.g., dials, knobs, buttons) to receive commands for actions from the operator of the vehicle 11.

Figure 3:
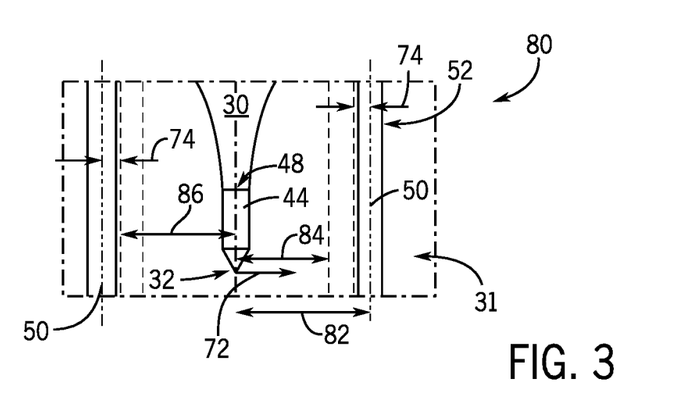
FIG. 3 is an embodiment of an image captured by one or more imaging devices of the material throw monitoring system.

FIG. 3 illustrates an embodiment of an image 80 of the monitored area 31 captured by one or more sensors 29 of the material throw monitoring system 27. The image 80 may be one format of feedback provided by the one or more sensors 29 to the controller 78. The image 80 may show the blade 44 and the ground engaging point 32 relative to one or more thresholds. Additionally, one or more nearby rows 50 (e.g., adjacent rows) may be shown in the image 80. The one or more nearby rows 50 may be spaced from the blades 44 of the current row 48 by a row spacing 82. In some embodiments, the row spacing 82 is approximately 6, 10, 12, 15, 18, 24, 30, 36 or more inches. The controller of the material throw monitoring system 27 may associate objects (e.g., ridges 70, thrown material 66) identified in portions of the image 80 with determined distances based at least in part on a calibration of the sensor 29 at a known location of the implement 10. For example, the image of FIG. 3 may identify a first threshold 84 and a second threshold 86 from the blade 44 of the current row 48. In some embodiments, the thresholds 84, 86 may be added (e.g., superimposed) to an image displayed to an operator via a user interface and/or stored in a memory of the controller. For example, an operator may observe the image on the user interface of the vehicle and adjust the speed of the vehicle based on the thrown material 66 and/or settled material 68 observed in the image relative to the thresholds 84, 86.

Figure 4:
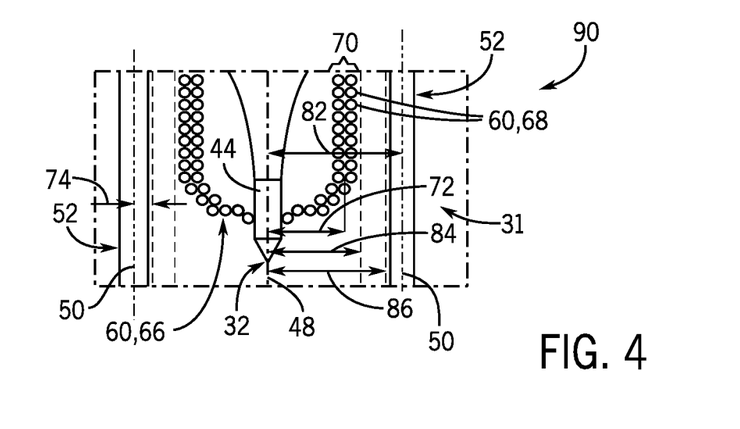
FIG. 4 is an embodiment of an image captured by one or more imaging devices, depicting material thrown outside of a threshold.

In some embodiments, the material throw monitoring system 27 may determine the throw distance 72 of material 60 from the blade 44 forming the current row 48 through monitoring changes in the image 80. For example, the material throw monitoring system 27 may monitor portions of the image 80 for airborne material 66 and/or settled material 68 to determine the throw distance 72. In some embodiments, the controller 78 is configured to distinguish the material 60 in the image from the ground 33 and from elements of the hoe opener 18 such that the throw distance 72 may be determined from observations of the material 60 in certain portions of the image 80. FIG. 4 illustrates a second image 90 in which the settled material 68 formed the ridge 70 within a first threshold 84 from the blade 44 of the current row 48. The controller 78 may identify a location of the ridge 70 within the second image 90 relative to the first threshold 84 and the second threshold 86, and determine the throw distance 72 based at least in part on the identified location of the ridge 70.

Based on the determined throw distance 72 of monitored material in the second image 90, the material throw monitoring system 27 may notify an operator of the implement 10 of the throw distance 72 and a suggested action to improve performance of the implement 10. For example, if the determined throw distance 72 is less than a first threshold 84, then the material throw monitoring system 27 may notify the operator that the speed of the agricultural implement may be increased without throwing material 60 onto the nearby rows 50. In some embodiments, the material throw monitoring system 27 may automatically increase the speed of the agricultural implement if the throw distance 72 is less than the first threshold 84, but only suggest that the speed may be increased if the throw distance 72 is determined to be between the first threshold 84 and the second threshold 86. In some embodiments, the material throw monitoring system 27 may automatically increase the speed of the agricultural implement if the throw distance 72 is between the first threshold 84 and the second threshold 86, such as so that the throw distance 72 is increased to be approximately equal to the second threshold 86.

Figure 5:
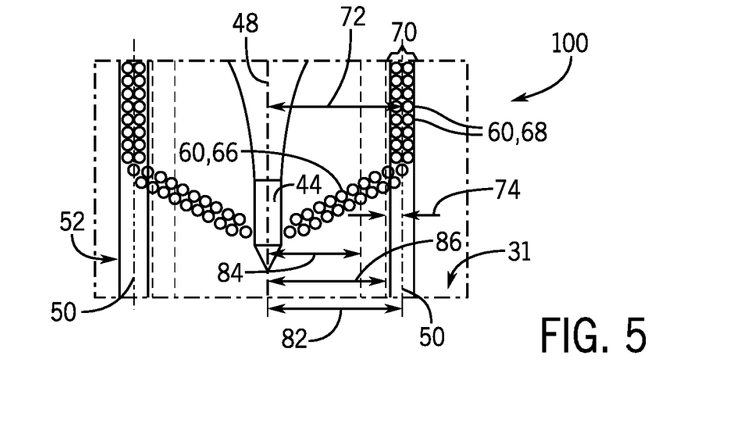
FIG. 5 is an embodiment of an image captured by one or more imaging devices, depicting material thrown within the threshold.

FIG. 5 illustrates an embodiment of a third image 100 in which the settled material 68 formed a ridge 70 beyond the second threshold 86 from the blade 44 and over nearby rows 50. Where the determined throw distance 72 is greater than the second threshold 86, then the material throw monitoring system 27 may notify the operator that decreasing the speed of the agricultural implement will reduce or eliminate the material 60 thrown onto the nearby rows 50 or thrown within the minimum distance 74 of the nearby rows 50. In some embodiments, the material throw monitoring system 27 may automatically reduce the speed of the agricultural implement in response to a determination that the throw distance 72 is greater than the second threshold 86. However, in some embodiments, the row spacing 82 may be a third threshold, such that if the determined throw distance 72 is greater than or equal to the row spacing 82, the material throw monitoring system 27 may automatically reduce the speed of the agricultural implement.

Figure 6:
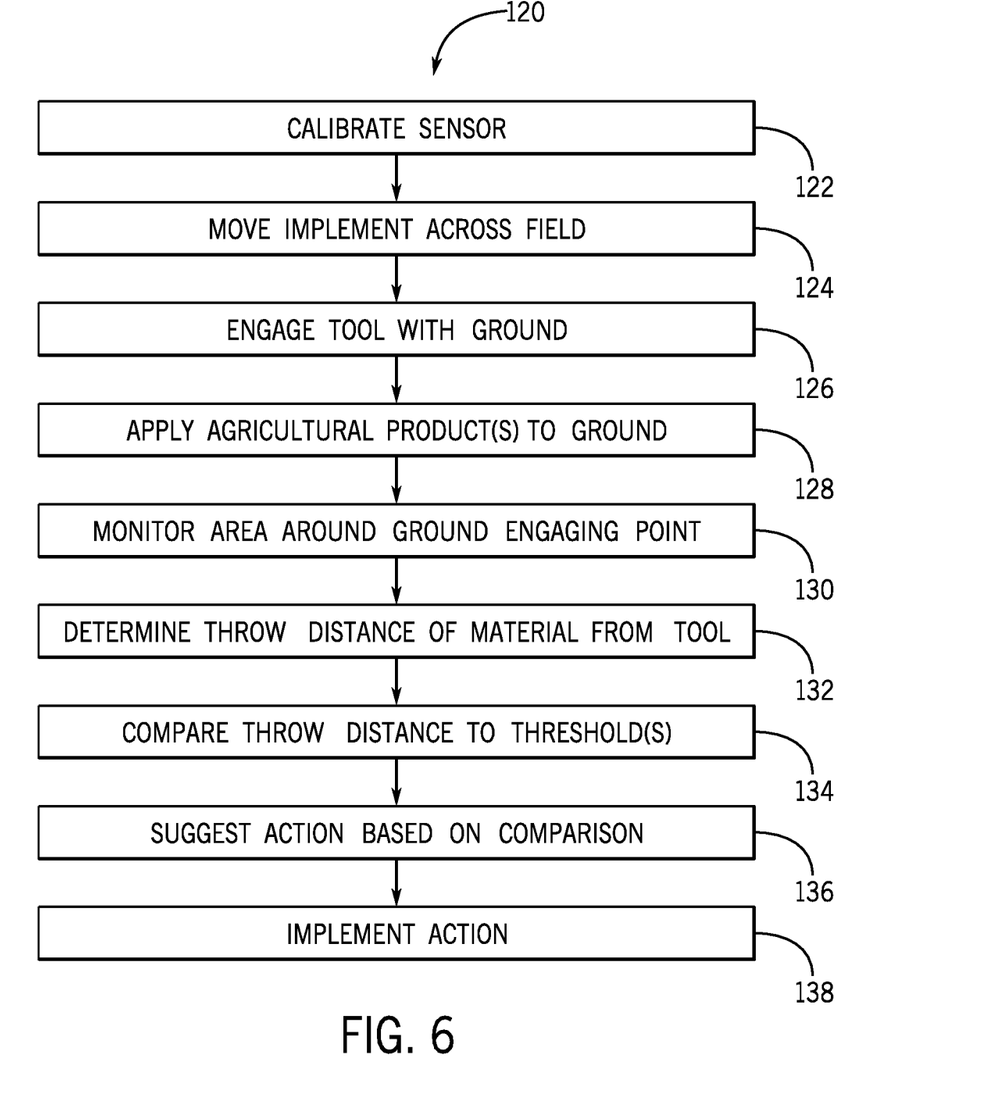
FIG. 6 is a flow chart of an embodiment of a method for monitoring the material thrown by the agricultural implement of FIG. 1.

FIG. 6 illustrates an embodiment of a method 120 for utilizing the material throw monitoring system described above during operation of the agricultural implement. In some embodiments, the one or more sensors of the material throw monitoring system are calibrated (block 122). The one or more sensors may be calibrated when disposed on the agricultural implement and/or prior to execution of a seeding or planting operation. Each of the one or more sensors may be arranged at calibrated locations on the implement and oriented in calibrated directions towards respective ground engaging points of the implement. In some embodiments, the implement may include 1 to 10, 2 to 8, 3 to 5, or 4 or more sensors, such as cameras, depth sensors, LIDAR sensors, ultrasonic sensors, or any combination thereof. The one or more sensors are calibrated so that the feedback (e.g., images, depth of field data) from the sensors may be utilized by the controller of the material throw monitoring system to determine the throw distances of material within the monitored areas.

During operation of the implement, such as a seeding or planting operation, the implement is moved (block 124) across a field. While the implement is moved across the field, the ground engaging tools (e.g., hoe openers, discs) engage (block 126) with the soil to form the trenches and apply (block 128) the one or more agricultural products therein behind the ground engaging tools. It is appreciated that each of the ground engaging tools engages with the soil at respective ground engaging points. The one or more sensors of the material throw monitoring system monitor (block 130) the areas around the one or more respective ground engaging points. Each sensor may monitor the respective area on one or both sides of where the monitored ground engaging tool contacts the ground. While monitoring the respective area, each sensor provides to the controller feedback related to one or more objects (e.g., soil, residue, ridges of material, nearby rows) within the respective area. The feedback provided to the controller may include, but is not limited to images, video, depth of field data, ultrasonic data, or any combination thereof.

From the feedback, the controller determines (block 132) the throw distance of material from the ground engaging tool. The controller may determine the throw distance of thrown material and/or settled material within the monitored area based on the feedback received from the one or more sensors. In some embodiments, the controller may utilize image processing algorithms to distinguish the material from objects in the background of the images, such as elements of the agricultural implement or the ground. The controller may identify the material within certain locations of the image, then determine the throw distance from the identified locations within the image by associating the identified locations of the objects with known distances from the prior calibration (block 122).

The controller compares (block 134) the determined throw distances of material with one or more thresholds. Based on the comparison, the controller may suggest (block 136) an action for the operator to implement. In some embodiments, the controller may implement (block 138) the action automatically with no prior notification to the operator. If the controller determines (block 134) that the determined throw distance is less than a first threshold, then the controller may suggest (block 136) the operator increase the speed of the vehicle, thereby increasing the efficiency of the seeding or planting operation. In some embodiments, the controller may automatically increase (block 138) the speed of the vehicle if the determined throw distance is less than the first threshold and a second threshold, yet the controller may only suggest (block 136) the operator increase the speed of the vehicle if the determined throw distance is between the first threshold and the second threshold. If the controller determines (block 134) that the determined throw distance is greater than the second threshold and a third threshold (e.g., row spacing) associated with material thrown onto a nearby row, then the controller may automatically decrease (block 138) the speed of the vehicle. However, if the controller may only suggest (block 136) the operator decrease the speed of the vehicle if the determined throw distance is between the second threshold and the third threshold. In some embodiments, the controller may only automatically increase the speed of the vehicle if the determined throw distance is less than the first threshold and the vehicle speed is greater than an operator-defined speed (e.g., idle speed), thereby limiting undesired automatic increases to the vehicle speed.

After the suggestion of an action (block 136) and/or the implementation of the action (block 138), the controller may repeat blocks 130-138 to monitor the area throughout operation of the implement in the field. Feedback cycles from sensors of the monitored area may indicate whether the suggested actions should be maintained or retracted. In some embodiments, later feedback cycles from sensors of the monitored area may indicate changes in the determined throw distance such that an automatically implemented action (e.g., speed adjustment) should be reversed.

Although the actions discussed above relate to the controller suggesting actions (block 136) and/or implementing actions (block 138) that adjust the speed of the vehicle to affect the throw distance, the controller may suggest and/or implement other actions to affect the throw distance. These other actions may include, but are not limited to adjusting the force on the ground engaging tool (e.g., hoe opener, disc), adjusting the depth of the ground engaging tool, and adjusting residue coulters. For example, decreasing the force on the ground engaging tool or decreasing the depth of the ground engaging tool may decrease the throw distance. Adjustments to the speed or depth of the residue coulters that are in front of the ground engaging tool on the agricultural implement may affect the amount of material displaced by the ground engaging tool, which may affect the throw distance of such material. For example, reducing the residue displaced by the ground engaging tool at the ground engaging point may increase the throw distance of the thrown material.

As discussed above, the material throw monitoring system 27 may include multiple sensors that each monitor (block 130) respective areas around separate ground engaging tools of the agricultural implement. In some embodiments, the controller determines an appropriate suggested action or automatically implemented action based on the feedback from a primary sensor of the material throw monitoring system. In some embodiments, the controller determines an appropriate suggested action or automatically implemented action based on an analysis of the feedback from multiple sensors of the material throw monitoring system. Accordingly, the controller may determine (block 132) the throw distance of material and compare (block 134) the determined throw distance of the material for each of the sensors of the agricultural implement. Due to conditions of the field, the determined throw distance may vary among the areas monitored by the material throw monitoring system. In some embodiments, the controller may suggest and/or implement an appropriate action based at least in part on the comparison of multiple determined throw distances. For example, if the first determined throw distance from a first sensor is greater than the first threshold (associated with no automatic speed increase or only a suggested speed increase) and the second determined throw distance from a second sensor is below the first threshold, then the controller may only suggest (block 136) increasing the speed of the vehicle to a speed that may increase the first determined throw distance to the second threshold rather than automatically increasing the speed of the vehicle. In some embodiments, the controller determines the appropriate action to reduce or eliminate throwing material on any nearby rows. In some embodiments, the controller determines the appropriate action based on an average value of the determined throw distances.

Technical effects of the material throw monitoring system described above include enabling the agricultural implement to dispose agricultural products at a desired depth while reducing or eliminating the material (e.g., soil, residue) disposed over any rows of the field. Through monitoring the throw distance of material displaced by the ground engaging tools of the implement to form the current rows, the vehicle and/or the implement may be controlled to reduce or eliminate the material that may be thrown over nearby rows. Reducing or eliminating the material thrown onto any rows may facilitate application of the agricultural products at a consistent and desired depth across the rows of the field. Through improved placement of agricultural products at the desired depths, the emergence rate of seedlings may increase and the maturation time may be more accurately estimated.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. An agricultural planting or seeding implement, comprising:
    a frame;
    at least one row unit comprising:
        a first ground engaging tool configured to engage with a ground surface at a first ground engaging point to form a first trench; and
        a conduit configured to deposit one or more agricultural products in the first trench; and
    a material throw monitoring system comprising:
        a first sensor oriented toward the first ground engaging point and configured to provide first feedback to a controller based at least in part on material displaced by the first ground engaging tool in a first area around the first ground engaging tool; and
        the controller coupled to the first sensor, wherein the controller is configured to:
            determine a first throw distance of the material relative to the first ground engaging tool based on the first feedback from the first sensor;
            determine an action to adjust operation of the agricultural planting or seeding implement based on a comparison of the first throw distance with a threshold; and
            communicate the action with a vehicle controller of a vehicle coupled to the agricultural planting or seeding implement.

2. The agricultural planting or seeding implement of claim 1, wherein the first sensor comprises a depth sensor, a LIDAR sensor, an ultrasonic sensor, or any combination thereof.

3. The agricultural planting or seeding implement of claim 1, wherein the first sensor comprises a camera, and the first feedback comprises one or more images.

4. The agricultural planting or seeding implement of claim 1, wherein the material displaced by the first ground engaging tool comprises a ridge of settled material, and the first throw distance comprises a first distance from the first ground engaging tool to the ridge.

5. The agricultural planting or seeding implement of claim 1, wherein the material displaced by the first ground engaging tool comprises thrown material, the first feedback comprises images of the thrown material or depth data associated with the thrown material, and the first throw distance comprises a measured distance from the first sensor to the thrown material.

6. The agricultural planting or seeding implement of claim 1, wherein the first sensor is disposed in front of the first ground engaging point relative to a direction of travel of the agricultural planting or seeding implement.

7. The agricultural planting or seeding implement of claim 1, wherein the first ground engaging tool comprises a hoe opener or a disc.

8. The agricultural planting or seeding implement of claim 1, wherein the first area around the first ground engaging tool comprises at least one nearby row a spacing distance from the first ground engaging point, and the threshold is less than or equal to the spacing distance.

9. The agricultural planting or seeding implement of claim 8, wherein the action to adjust operation of the agricultural planting or seeding implement comprises an adjustment to reduce a speed of the vehicle coupled to the agricultural planting or seeding implement in response to determining that the first throw distance of the material is greater than the threshold.

10. The agricultural planting or seeding implement of claim 1, wherein the action to adjust operation of the agricultural planting or seeding implement comprises a notification to be displayed on a user interface of the vehicle, wherein the notification comprises a suggestion to increase a speed of the vehicle in response to determining that the first throw distance of the material is less than the threshold.

11. The agricultural planting or seeding implement of claim 1, wherein the at least one row unit comprises a second ground engaging tool configured to engage with the ground surface at a second ground engaging point to form a second trench; and
the material throw monitoring system comprises a second sensor oriented toward the second ground engaging point, wherein the second sensor is configured to provide second feedback to the controller based at least in part on material displaced by the second ground engaging tool in a second area around the second ground engaging tool;
wherein the controller is configured to determine a second throw distance of the material relative to the second ground engaging tool based on the second feedback from the second sensor, and the controller is configured to determine the action based on the comparison of the first throw distance with the threshold and a second comparison of the second throw distance with the threshold.

12. A method, comprising:
engaging a ground engaging tool of a row unit of an agricultural planting or seeding implement with a ground surface at a ground engaging point to form a trench;
depositing one or more agricultural products from the agricultural planting or seeding implement into the trench;
monitoring an area around the ground engaging point with a sensor oriented toward the ground engaging point;
providing feedback from the sensor to a controller based at least in part on material displaced by the ground engaging tool in the area;
determining a throw distance of the material based on the feedback;
comparing the throw distance to one or more thresholds; and
determining an action to adjust the throw distance of the material based on the comparison.

13. The method of claim 12, wherein the feedback from the sensor comprises one or more images, and the sensor comprises a camera.

14. The method of claim 12, wherein the one or more thresholds comprise a first threshold less than a row spacing from the ground engaging point, and the action comprises increasing a speed of the agricultural planting or seeding implement across a field in response to determining the throw distance is less than the first threshold.

15. The method of claim 14, wherein the one or more thresholds comprise a second threshold at a minimum distance inward from an adjacent row positioned at the row spacing from the ground engaging point, and the action comprises suggesting an increase in the speed of the agricultural planting or seeding implement across the field in response to determining the throw distance is between the first threshold and the second threshold.

16. The method of claim 12, wherein the one or more thresholds comprise a row spacing from the ground engaging point, and the action comprises reducing a speed of the agricultural planting or seeding implement across a field in response to determining the throw distance is greater than or equal to the row spacing.

17. The method of claim 12, wherein determining the throw distance of the material based on the feedback comprises identifying one or more ridges of settled material within the monitored area.

18. An agricultural planting or seeding system, comprising:
a plurality of row units comprising a respective plurality of ground engaging tools configured to engage with a ground surface at a respective plurality of ground engaging points to form a respective plurality of trenches along a respective plurality of rows, wherein the plurality of row units is configured to position the plurality of rows a row spacing from one another;
a material throw monitoring system comprising:
a plurality of sensors, wherein each sensor is associated with a row unit of the plurality of row units, and each sensor is configured to provide a feedback based at least in part on material displaced in a respective area by the respective ground engaging tool in the respective area; and
a controller coupled to the plurality of sensors, wherein the controller is configured to:
determine a plurality of throw distances of the material relative to the plurality of rows based on the feedback from the plurality of sensors; and
automatically implement an action configured to reduce a throw distance of the plurality of throw distances in response to determining that the throw distance from a respective row of the plurality of rows is beyond a threshold, wherein the threshold is positioned at a minimum distance inward from an adjacent row of the plurality of rows.

19. The agricultural planting or seeding system of claim 18, wherein the action comprises reducing a speed of the plurality of row units across the ground surface, reducing a depth of the plurality of ground engaging tools, or adjusting a load on the plurality of ground engaging tools.

20. The agricultural planting or seeding system of claim 18, wherein the plurality of sensors comprises a plurality of cameras, the feedback from each sensor of the plurality of sensors comprises an image of the respective area, and the controller is configured to determine a respective throw distance of the plurality of throw distances based on identification of ridges of the material within the respective area, identification of thrown material within the respective area, or any combination thereof.

* * * * *